United States Patent
Sharma et al.

(10) Patent No.: US 7,806,220 B2
(45) Date of Patent: Oct. 5, 2010

(54) TORQUE DISTRIBUTING DRIVE MECHANISM FOR MOTOR VEHICLES

(75) Inventors: Anupam Sharma, East Syracuse, NY (US); Timothy M. Burns, Elbridge, NY (US)

(73) Assignee: Magna Powertrain, Inc., Troy, MI (US)

( * ) Notice: Subject to any disclaimer, the term of this patent is extended or adjusted under 35 U.S.C. 154(b) by 0 days.

(21) Appl. No.: 12/399,365

(22) Filed: Mar. 6, 2009

(65) Prior Publication Data

US 2009/0181819 A1 Jul. 16, 2009

Related U.S. Application Data

(63) Continuation of application No. 11/396,138, filed on Mar. 31, 2006, now Pat. No. 7,503,416.

(60) Provisional application No. 60/694,475, filed on Jun. 28, 2005.

(51) Int. Cl.
*B60K 17/354* (2006.01)
*F16H 37/08* (2006.01)

(52) U.S. Cl. .................. 180/247; 180/248; 180/249; 180/251; 475/198; 475/202; 475/203; 475/204; 475/29; 475/28; 475/19

(58) Field of Classification Search ............... 180/247, 180/248, 249, 251; 475/198, 202, 203, 204, 475/205, 206, 29, 28, 19
See application file for complete search history.

(56) References Cited

U.S. PATENT DOCUMENTS

| | | | |
|---|---|---|---|
| 672,620 A | 6/1901 | Buffum | |
| 856,703 A | 6/1907 | Iversen | |
| 1,382,289 A | 6/1921 | Janicki | |
| 1,792,485 A | 2/1931 | Fawick | |
| 1,954,686 A | 4/1934 | Stickney | |
| 1,964,956 A | 7/1934 | Lincoln | |
| 2,075,980 A | 4/1937 | Fawick | |
| 2,466,683 A | 4/1949 | Buckendale | |
| 3,690,426 A | 9/1972 | Weisgerber | |
| 4,677,873 A | 7/1987 | Eastman et al. | |
| 4,691,593 A | 9/1987 | Mueller | |

(Continued)

FOREIGN PATENT DOCUMENTS

WO    WO 02/09966 A1    2/2002

*Primary Examiner*—Lesley Morris
*Assistant Examiner*—Marlon A Arce
(74) *Attorney, Agent, or Firm*—Harness, Dickey & Pierce, P.L.C.

(57) ABSTRACT

A drive axle assembly includes first and second axleshafts and a drive mechanism coupling a driven input shaft to the axleshafts. The drive mechanism includes a differential assembly, a planetary gear assembly operably disposed between the differential assembly and the first axleshaft, a brake and first and second mode clutches. The first clutch is operable with the brake and the planetary gear assembly to increase the rotary speed of the first axleshaft which, in turn, causes a corresponding decrease in the rotary speed of the second axleshaft. The second clutch is operable with the brakes and the planetary gear assembly to decrease the rotary speed of the first axleshaft so as to cause an increase in the rotary speed of the second axleshaft. A control system controls actuation of both mode clutches.

25 Claims, 6 Drawing Sheets

U.S. PATENT DOCUMENTS

| | | | |
|---|---|---|---|
| 4,705,134 A * | 11/1987 | Kitade | 180/233 |
| 4,757,728 A | 7/1988 | Pitsch | |
| 4,763,747 A | 8/1988 | Muller | |
| 4,973,296 A | 11/1990 | Shibahata | |
| 5,020,626 A * | 6/1991 | Kodama | 180/233 |
| 5,046,998 A | 9/1991 | Frost | |
| 5,057,062 A | 10/1991 | Yamasaki et al. | |
| 5,078,660 A | 1/1992 | Williams et al. | |
| 5,370,588 A | 12/1994 | Sawase et al. | |
| 5,415,598 A | 5/1995 | Sawase et al. | |
| 5,456,641 A * | 10/1995 | Sawase | 475/86 |
| 5,632,185 A | 5/1997 | Gassmann | |
| 5,662,663 A | 9/1997 | Shallmann | |
| 5,692,987 A | 12/1997 | Shibahata et al. | |
| 5,699,888 A | 12/1997 | Showalter | |
| 5,904,634 A | 5/1999 | Teraoka | |
| 5,910,064 A | 6/1999 | Kuroki | |
| 5,911,291 A | 6/1999 | Suetake et al. | |
| 5,989,146 A * | 11/1999 | Brown et al. | 475/207 |
| 6,056,660 A | 5/2000 | Mimura | |
| 6,120,407 A | 9/2000 | Mimura | |
| 6,213,241 B1 | 4/2001 | Kita et al. | |
| 6,378,677 B1 | 4/2002 | Kuroda et al. | |
| 6,394,246 B1 | 5/2002 | Gassmann et al. | |
| 6,520,880 B1 | 2/2003 | Fukushima et al. | |
| 6,533,090 B2 | 3/2003 | Osborn et al. | |
| 6,616,566 B2 | 9/2003 | Gorlich | |
| 6,645,108 B1 | 11/2003 | Gradu | |
| 6,685,594 B2 | 2/2004 | Kanazawa | |
| 6,805,651 B2 * | 10/2004 | Lipman | 475/221 |
| 6,824,487 B2 | 11/2004 | Williams et al. | |
| 6,862,953 B2 | 3/2005 | Fitzgerald et al. | |
| 6,962,227 B1 | 11/2005 | Kirkwood | |
| 7,004,876 B2 | 2/2006 | Puiu | |
| 7,070,189 B2 * | 7/2006 | Grauss | 280/32.6 |
| 7,150,693 B2 * | 12/2006 | Ishimaru et al. | 475/206 |
| 7,293,783 B2 * | 11/2007 | Whiteside et al. | 280/32.6 |
| 2004/0023743 A1 | 2/2004 | Cook et al. | |
| 2005/0159264 A1 * | 7/2005 | Puiu et al. | 475/198 |
| 2005/0176543 A1 * | 8/2005 | Kirkwood et al. | 475/5 |
| 2005/0252707 A1 | 11/2005 | Bowen | |
| 2005/0261098 A1 | 11/2005 | Bowen | |
| 2005/0261099 A1 * | 11/2005 | Bowen | 475/205 |
| 2005/0266952 A1 | 12/2005 | Puiu | |
| 2005/0266953 A1 | 12/2005 | Puiu | |

\* cited by examiner

TORQUE DISTRIBUTING DRIVE MECHANISM FOR MOTOR VEHICLES

CROSS REFERENCE

This application is a continuation of U.S. patent application Ser. No. 11/396,138 filed on Mar. 31, 2006, which claims the benefit of U.S. Provisional Application Ser. No. 60/694,475 filed Jun. 28, 2005. The entire disclosures of each of the above applications are incorporated herein by reference.

FIELD OF THE INVENTION

The present invention relates generally to differential assemblies for use in motor vehicles and, more specifically, to a differential assembly equipped with a torque vectoring drive mechanism and an active control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw control system.

To achieve this objective, the drive axle assembly of the present invention includes first and second axleshafts connected to a pair of wheels and a drive mechanism that is operable to transfer drive torque from a driven input shaft to the first and second axleshafts. The drive mechanism includes a differential assembly, a planetary gear assembly, a brake and first and second friction clutches. The planetary gear assembly is operably disposed between the differential assembly and the first axleshafts. The first friction clutch is operable in association with the brake and the planetary gear assembly to increase the rotary speed of the first axleshaft which, in turn, causes a corresponding decrease in the rotary speed of the second axleshaft. In contrast, the second friction clutch is operable in association with the brake and the planetary gear assembly to decrease the rotary speed of the first axleshaft so as to cause a corresponding increase in the rotary speed of the second axleshaft. Accordingly, selective control over actuation of the brake and one or both of the first and second friction clutches provides adaptive control of the speed differentiation and the torque transferred between the first and second axleshafts. A control system including and ECU and sensors are provided to control actuation of both friction clutches and the brake.

Pursuant to an alternative objective, the drive mechanism can be utilized in a power transfer unit, such as a transfer case, of a four-wheel drive vehicle to adaptively control the front-rear distribution of drive torque delivered from the powertrain to the front and rear wheels.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
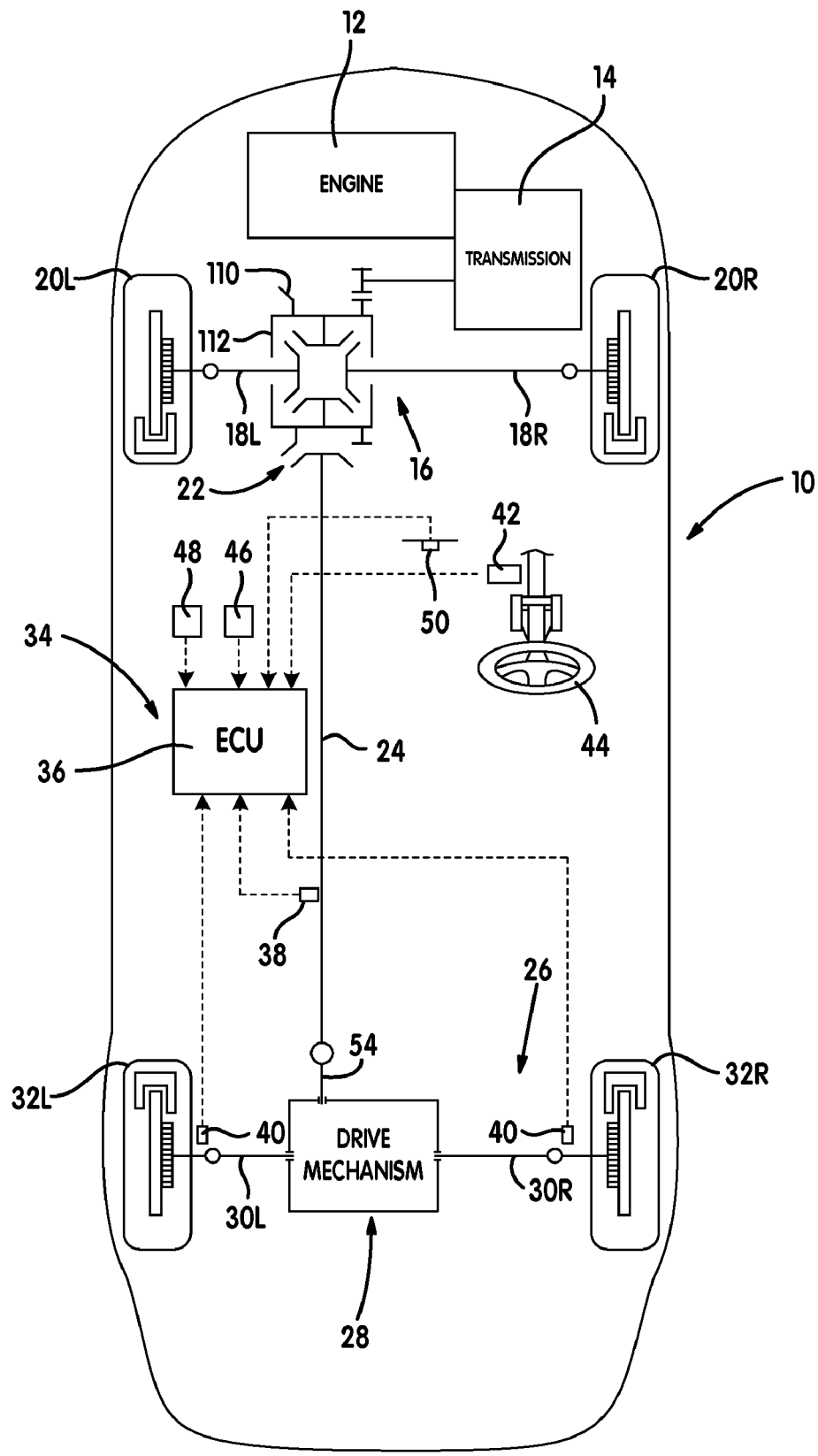
FIG. 1 is a diagrammatical illustration of an all-wheel drive motor vehicle equipped with a torque distributing drive axle assembly and active yaw control system of the present invention.

Referring to FIG. 1, an all-wheel drive vehicle 10 includes an engine 12 mounted in a front portion of vehicle 10, a transmission 14 driven by engine 12, a front differential 16 which connects the output of transmission 14 to front axleshafts 18L and 18R for driving left and right front wheels 20L and 20R, a power transfer unit ("PTU") 22 which connects front differential 16 to a propshaft 24 and a rear axle assembly 26 having a drive mechanism 28 which connects propshaft 24 to rear axleshafts 30L and 30R for driving left and right rear wheels 32L and 32R. As will be detailed, drive mechanism 28 is operable in association with a yaw control system 34 for controlling the transmission of drive torque through rear axleshafts 30L and 30R to rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for determining a front wheel speed value based on rotation of propshaft 24, a pair of rear wheel speed sensors 40 are operable to detect the individual rear wheel speed values based rotation of left and right axle shafts 30L and 30R and a steering angle sensor 42 is provided to detect the steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of a pair of brakes and a torque vectoring friction clutch that are associated with drive mechanism 28 by utilizing a control strategy that is based on input signals from the various sensors and lock switch 50.

Rear axle assembly 26 includes an axle housing 52 within which drive mechanism 28 is supported. In general, drive mechanism 28 includes an input shaft 54, a differential assembly 56, a planetary gear assembly 58, a first or "overdrive" mode clutch 60, a second or "underdrive" mode clutch 62 and a brake 64. As seen, input shaft 54 includes a pinion gear 66 that is in constant mesh with a hypoid ring gear 68. Hypoid ring gear 68 is fixed for rotation with a ring gear 70 which acts as the input component of differential assembly 56. Differential assembly 56 further includes a first output component shown as a sun gear 72 that is fixed for rotation with right axleshaft 30R, a second output component shown as a differential carrier 74 that is fixed for rotation with left axleshaft 30L and a plurality of meshed pairs of first pinions 76 and second pinions 78. Carrier 74 includes a first carrier ring 80 fixed to left axleshaft 30L, a second carrier ring 82 and a set of first pins 84 extending between carrier rings 80 and 82 on which first pinions 76 are rotatably supported. Carrier 74 also includes a set of second pins 86 extending between carrier rings 80 and 82 which rotatably support second pinions 78. As seen, first pinions 76 are meshed with sun gear 72 while second pinion gears 78 are meshed with ring gear 70. While not limited thereto, the gearing associated with differential assembly 56 is preferably configured to normally provide an equal torque split (i.e., 50-50) to its output components.

Planetary gear assembly 58 is a ravigneaux gearset having a first gearset 90 and a second gearset 92. First gearset 90 includes a first sun gear 94, a first ring gear 96 and a set of first planet gears 98 meshed with first sun gear 94 and first ring gear 96. Each of first planet gears 98 is rotatably supported on a post 100 extending between first and second carrier rings 102 and 104, respectively, that in combination define a first planet carrier 106. As seen, second carrier ring 104 is fixed for common rotation with right axleshaft 30R.

Second gearset 92 includes a second sun gear 110, a second ring gear 112 and a set of second planet gears 114 meshed therewith. Each of second planet gears 114 is rotatably supported on a post 116 extending between third and fourth carrier rings 118 and 120, respectively, that in combination define a second planet carrier 122. As seen, second ring gear 112 is coupled via a first drum 124 to second carrier ring 104 of first planet carrier 106 for common rotation with right axleshaft 30R. In addition, fourth carrier ring 120 is fixed via a second drum 126 for common rotation with first ring gear 96.

Figure 2:
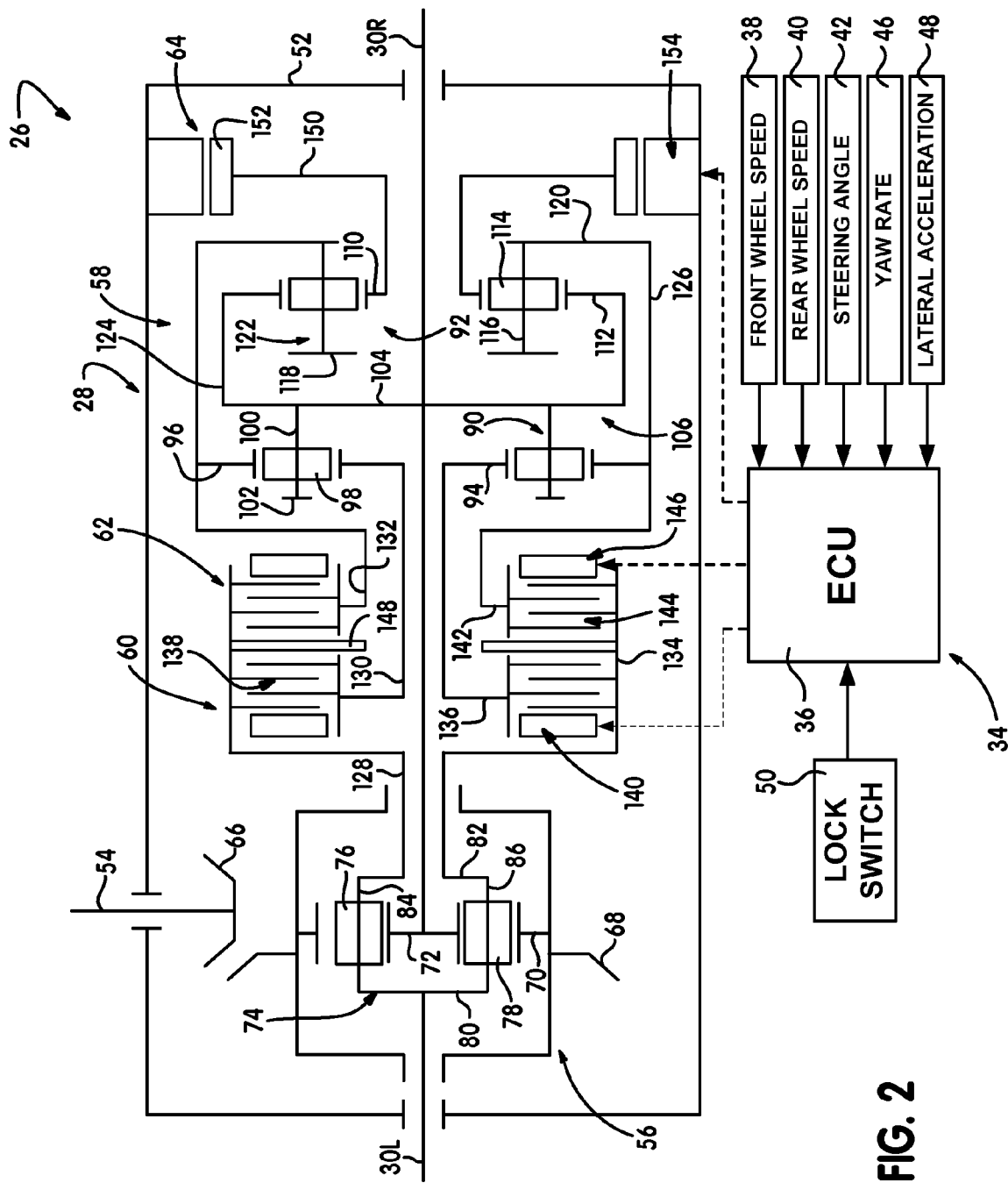
FIG. 2 is a schematic illustration of the drive axle assembly shown in FIG. 1 according to a first embodiment of the present invention.

With continued reference to FIG. 2, drive mechanism 28 is shown to further include a first transfer shaft 128 that is rotatably supported on right axleshaft 30R and which is fixed to second carrier ring 82 for common rotation with differential carrier 74 of differential assembly 56. Likewise, a second transfer shaft 130 is rotatably supported on right axleshaft 30R and is fixed for common rotation with first sun gear 94 of planetary gear assembly 58. Furthermore, a third transfer shaft 132 is rotatably supported on second transfer shaft 130 and is fixed to second drum 126 for common rotation with first ring gear 96 and second planet carrier 122. As seen, first mode clutch 60 is operably disposed between first transfer shaft 128 and second transfer shaft 130 for selectively coupling first sun gear 94 of planetary gear assembly 58 to differential carrier 74 which, as noted, is commonly driven with left axleshaft 30L. First mode clutch 60 includes a clutch drum 134 fixed for rotation with first transfer shaft 128, a clutch hub 136 fixed for rotation with second transfer shaft 130, a multi-plate clutch pack 138 disposed between hub 136 and drum 134 and a power-operated clutch actuator 140.

First mode clutch 60 is operable in a first or "released" mode so as to permit unrestricted rotation of first sun gear 94 relative to differential carrier 74. In contrast, first mode clutch 60 is operable in a second or "locked" mode for inhibiting rotation of first sun gear 94 relative to differential carrier 74. First mode clutch 60 is shifted between its released and locked modes via actuation of clutch actuator 140 in response to control signals from ECU 36. Specifically, first mode clutch 60 is operable in its released mode when clutch actuator 140 applies a predetermined minimum clutch engagement force on clutch pack 138 and is further operable in its locked mode when clutch actuator 140 applies a predetermined maximum clutch engagement force on clutch pack 138.

Second mode clutch 62 is operably disposed between first transfer shaft 128 and third transfer shaft 132 for selectively coupling first ring gear 96 of planetary gear assembly 58 to differential carrier 74 of differential assembly 56. Second mode clutch 62 includes a clutch hub 142 fixed for rotation with third transfer shaft 132, a multi-plate clutch pack 144 disposed between hub 142 and drum 134 and a power-operated clutch actuator 146. As seen, a reaction plate 148 driven by clutch drum 134 is disposed between hubs 136 and 142 and separates clutch packs 138 and 144. Second mode clutch 62 is operable in a first or "released" mode so as to permit unrestricted rotation of first ring gear 96 relative to differential carrier 74. In contrast, second mode clutch 62 is operable in a second or "locked" mode for inhibiting rotation of first ring gear 96 relative to differential carrier 74. Second mode clutch 62 is shifted between its released and locked modes via actuation of clutch actuator 146 in response to control signals from ECU 36. Specifically, second mode clutch 62 is operable in its released mode when clutch actuator 146 applies a predetermined minimum clutch engagement force on clutch pack 144 and is further operable in its locked mode when clutch actuator 146 applies a predetermined maximum clutch engagement force on clutch pack 144.

Brake 64 is shown to be operably arranged between second sun gear 110 and axle housing 52. Brake 64 includes a brake hub 150 that is fixed for rotation with second sun gear 110 and has a rim segment with a layer of friction material 152 thereon. Brake 64 also includes a power-operated brake actuator 154. Brake 64 is operable in a first or "released" mode to permit unrestricted rotation of second sun gear 110. With brake 64 in its released mode, brake actuator 154 is disengaged from friction material 152 on the rim segment of brake hub 148. In contrast, brake 64 is also operable in a second or "locked" mode for inhibiting rotation of second sun gear 110. With brake 64 in its locked mode, brake actuator 154 is engaged with friction material 152 on the rim segment of brake hub 150 so as to brake rotation of second sun gear 110. Brake 64 is shifted between its released and locked modes via actuation of power-operated brake actuator 154 in response to control signals from ECU 36.

Figure 3:
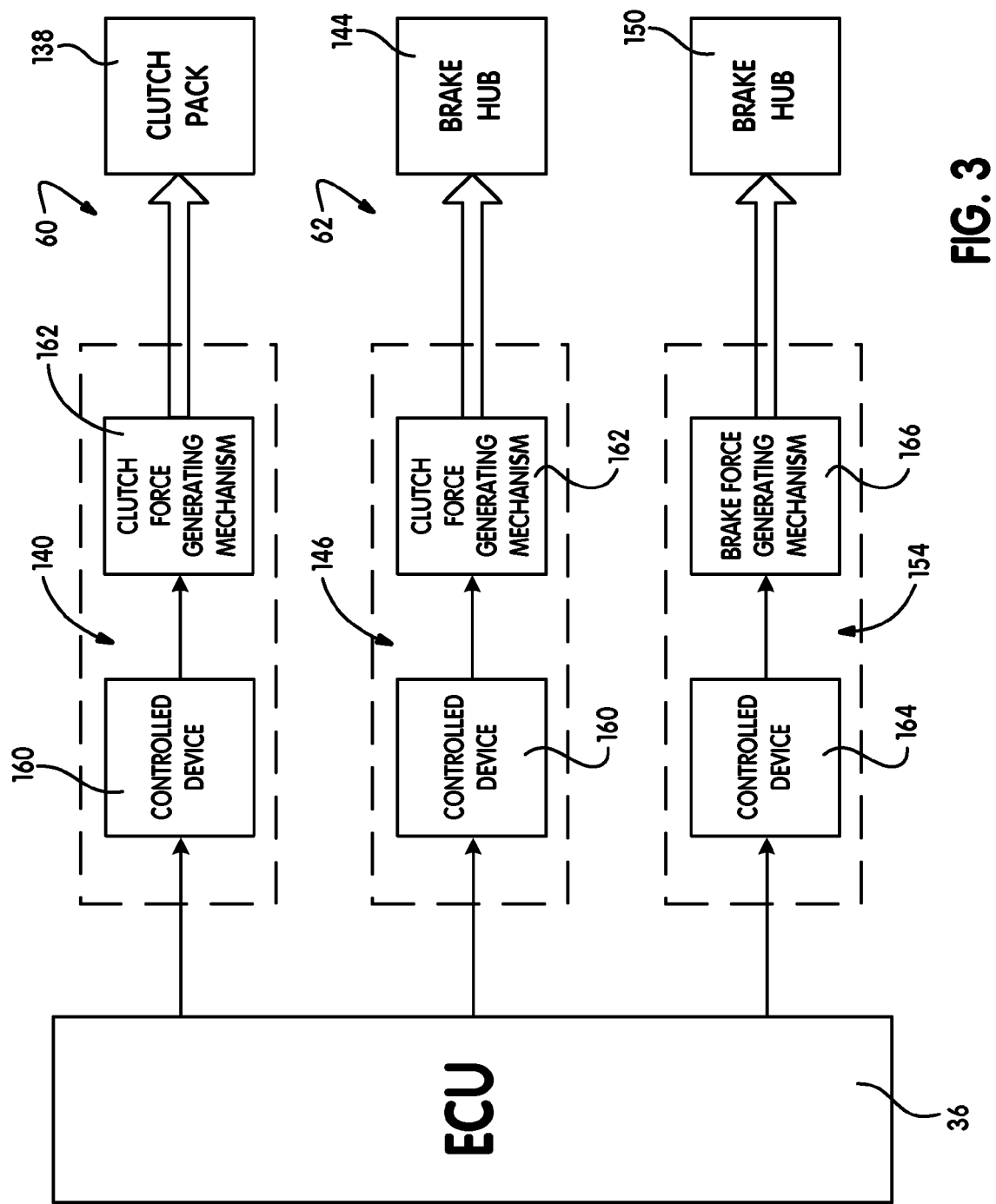
FIG. 3 is a diagrammatical illustration of the power-operated brake actuators and the power-operated clutch actuator associated with the drive axle assembly of the present invention.

Power-operated clutch actuators 140 and 146 and power-operated brake actuator 154 are shown in block format to cumulatively represent the components required to accept a control signal from ECU 36 and generate an engagement force to be applied to its corresponding clutch pack or brake hub. To this end, FIG. 3 diagrammatically illustrates the basic components associated with such power-operated clutch and brake actuators. Specifically, power-operated clutch actuators 140 and 146 each include a controlled device 160 and a force generating mechanism 162. In electromechanical systems, controlled device 160 would represent such components as, for example, an electric motor or an electromagnetic solenoid assembly capable of receiving an electric control signal from ECU 36. The output of controlled device 160 would control operation of force generating mechanism 162. Force generating mechanism 162 could be comprised of, for example, a ball ramp unit, a ball screw unit, a leadscrew unit, a pivotal lever arm, rotatable cam plates, etc., all of which are capable of converting the output of controlled device 160 into a clutch engagement force. Force generating mechanism 162 functions to also transmit and exert the clutch engagement force onto clutch packs 138 and 144 via an apply plate that is moveable into and out of engagement with clutch packs. If a hydramechanical system is used, controlled device 160 would be a flow or pressure control valve operable in response to control signals from ECU 36 for delivering pressurized fluid from a fluid source to a piston chamber. A piston disposed for movement in the piston chamber would act as force generating mechanism 162. Preferably, controlled device 160 is capable of receiving variable electric control signals from ECU 36 for permitting modulation of the magnitude of the clutch engagement force generated and applied to clutch packs 138 and 144 so as to permit "adaptive" control of first and second mode clutches 60 and 62, respectively.

Brake actuator 154 is also schematically shown in FIG. 3 to include a controlled device 164 and a brake force generating mechanism 166. Controlled device 164 could be an electrically-operated motor or electromagnetic solenoid capable of receiving electric control signals from ECU 36. The output of controlled device 164 would control operation of force generating mechanism 166 comprised of, for example, a caliper unit capable of converting the output of controlled device 164 into a brake force that is applied to brake hub 150. Alternatively, force generating mechanism 166 could be any known clamping assembly capable of engaging and holding brake hub 150 against rotation.

In accordance with the arrangement shown, drive mechanism 28 is operable in coordination with yaw control system 34 to potentially establish five distinct operational modes for controlling the transfer of drive torque from input shaft 54 to axleshafts 30L and 30R. In particular, a first operational mode is established when first mode clutch 60, second mode clutch 62 and brake 64 are all in their released mode. As such, differential assembly 56 acts as an "open" differential so as to permit unrestricted speed differentiation with drive torque transmitted to each axleshaft 30L and 30R based on the tractive conditions at each corresponding rear wheel 32L and 32R. A second operational mode is established when first mode clutch 60, second mode clutch 62 and brake 64 are all in their locked mode such that differential assembly 56 acts as a "locked" differential with no speed differentiation permitted between rear axleshafts 30L and 30R. This mode can be intentionally selected via actuation of lock switch 50 when vehicle 10 is being operated off-road or on poor roads.

A third operational mode is established when first mode clutch 60 is shifted into its locked mode, second mode clutch 62 is shifted into its released mode and brake 64 is shifted into its locked mode. As a result, first sun gear 94 of gear assembly 58 is coupled for rotation with left axleshaft 30L through differential carrier 74 of differential assembly 56 while second sun gear 110 is braked. Upon rotation of right axleshaft 30R, gear assembly 58 causes first ring gear 96 to be driven at an increased speed relative to the rotary speed of first planet carrier 106. As such, first sun gear 94 is driven by first gearset 90 at a decreased rotary speed relative to right axleshaft 30R. Therefore, left axleshaft 30L is underdriven relative to right axleshaft 30R due to its connection to first sun gear 94 via first mode clutch 60 releaseably coupling first transfer shaft 128 to second transfer shaft 130. Accordingly, this third operational mode can be established to overdrive right axleshaft 30R when required to accommodate the current tractive or steering conditions detected and/or anticipated by ECU 36 based on the particular control strategy used.

A fourth operational mode is established when first mode clutch 60 is shifted into its released mode, second mode clutch 62 is shifted into its locked mode, and brake 64 is shifted into its locked mode. As a result, second planet carrier 122 and first ring gear 96 of gear assembly 58 are coupled to differential carrier 74 while second sun gear 110 is braked. As such, second planet carrier 122 causes first ring gear 96 to be driven at an increased speed relative to the rotary speed of first planet carrier 106. Since first ring gear 96 is coupled to differential carrier 74 via engagement of second mode clutch 62, right axleshaft 30R is underdriven relative to left axleshaft 30L for accommodating the tractive or steering conditions detected and/or anticipated by ECU 36. Finally, a fifth operational mode is established when brake 64 is shifted into its released mode and engagement of first and second modes clutches 60 and 62 is varied to provide a slip limiting function.

At the start of vehicle 10, power from engine 12 is transmitted to front wheels 20L and 20R through transmission 14 and front differential 16. This drive torque is also transmitted to drive mechanism 28 through PTU 22 and propshaft 24 for rotatably driving input pinion shaft 58. Typically, mode clutches 60 and 62 and brake 64 would be non-engaged such that drive torque is transmitted through differential unit 56 to rear wheels 32L and 32R. However, upon detection of lost traction at front wheels 20L and 20R, one or both mode clutches 60 and 62 and brake 64 can be engaged to provide drive torque to rear wheels 32L and 32R based on the tractive needs of vehicles 10. Typically, brake 64 is operated in its released mode, whereby planetary gear assembly 58 rotates as a unit. This is beneficial since only small, if any, slip speeds are generated across the clutch packs of mode clutches 60 and 62, thereby limiting the parasitic losses generated during most typical straight-ahead driving conditions. In addition, all torque transfer or "vectoring" between axleshafts 30L and 30R is transmitted through engagement of modes clutches 60 and 62. Further, only on-off control of brake 64 is required since modulated control of mode clutches 60 and 62 permits the adaptive torque regulation required for the torque vectoring and slip limiting characteristics.

In addition to on-off control of mode clutches 60 and 62 for establishing the various drive modes associated with direct or underdrive connections through planetary gearset 58, it is contemplated that variable clutch engagement forces can also be generated by power-operated clutch actuators 140 and 146 to adaptively control left-to-right speed and torque transfer characteristics. This adaptive control feature functions to provide enhanced yaw and stability control for vehicle 10. For example, a "reference" yaw rate can be determined based on the steering angle detected by steering angle sensor 42, a vehicle speed calculated based on signals from the various speed sensors, and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into the specific operative drive mode that is best suited to correct the actual or anticipated oversteer or understeer situation. Optionally, variable control of mode clutches 60 and 62 also permits adaptive regulation of the side-to-side torque and speed characteristics if one of the distinct drive modes is not adequate to accommodate the current steer tractive condition.

Figure 4:
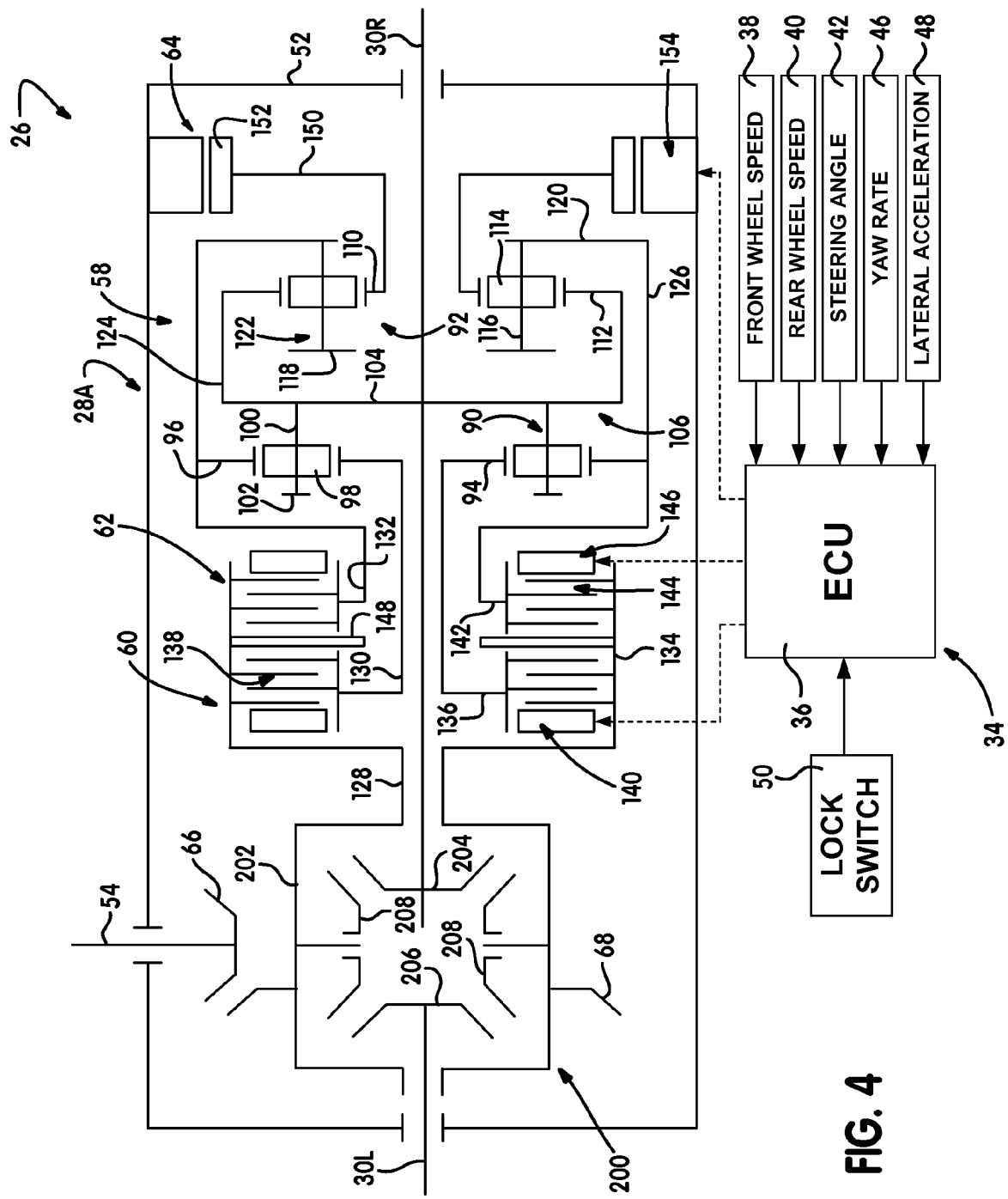
FIG. 4 is a schematic illustration of an alternative embodiment of the drive axle assembly of the present invention.

Referring now to FIG. 4, an alternative embodiment of drive mechanism 28 of FIG. 2 is shown and designated by reference numeral 28A. Generally speaking, a large number of components are common to both drive mechanism 28 and 28A, with such components being identified by the same reference numbers. However, drive mechanism 28A is shown to include a modified differential assembly 200 of the bevel type having a differential carrier 202 driven by hypoid ring gear 68 that acts as its input component. Differential assembly 200 further includes a first output component shown as a first side gear 204 that is fixed for common rotation with right axleshaft 30R, a second output component shown as a second side gear 206 that is fixed for common rotation with left axleshaft 30L and pinion gears 208 driven by carrier 202 and which are each meshed with side gears 204 and 206. As seen, first transfer shaft 128 now connects differential carrier 202 for common rotation with drum 134 of friction clutches 60 and 62.

Drive mechanism 28A is generally similar in operation to drive mechanism 28 except that mode clutches 60 and 62 now function to selectively connect gear assembly 58 to the input component (i.e., carrier 202) of differential 200 instead of directly to its second output component. As such, engagement of mode clutches 60 and 62 when brake 64 is engaged results in torque vectoring between axleshafts 30L and 30R through pinion gears 208. Thus, the rotary speed of left axleshaft 30L relative to right axleshaft 30R can be increased or decreased by controlling on/off engagement of brake 64 and variable engagement of mode clutches 60 and 62 in the same manner previously described for driven mechanism 28 to establish the various distinct operational modes for drive mechanism 28A.

Figure 5:
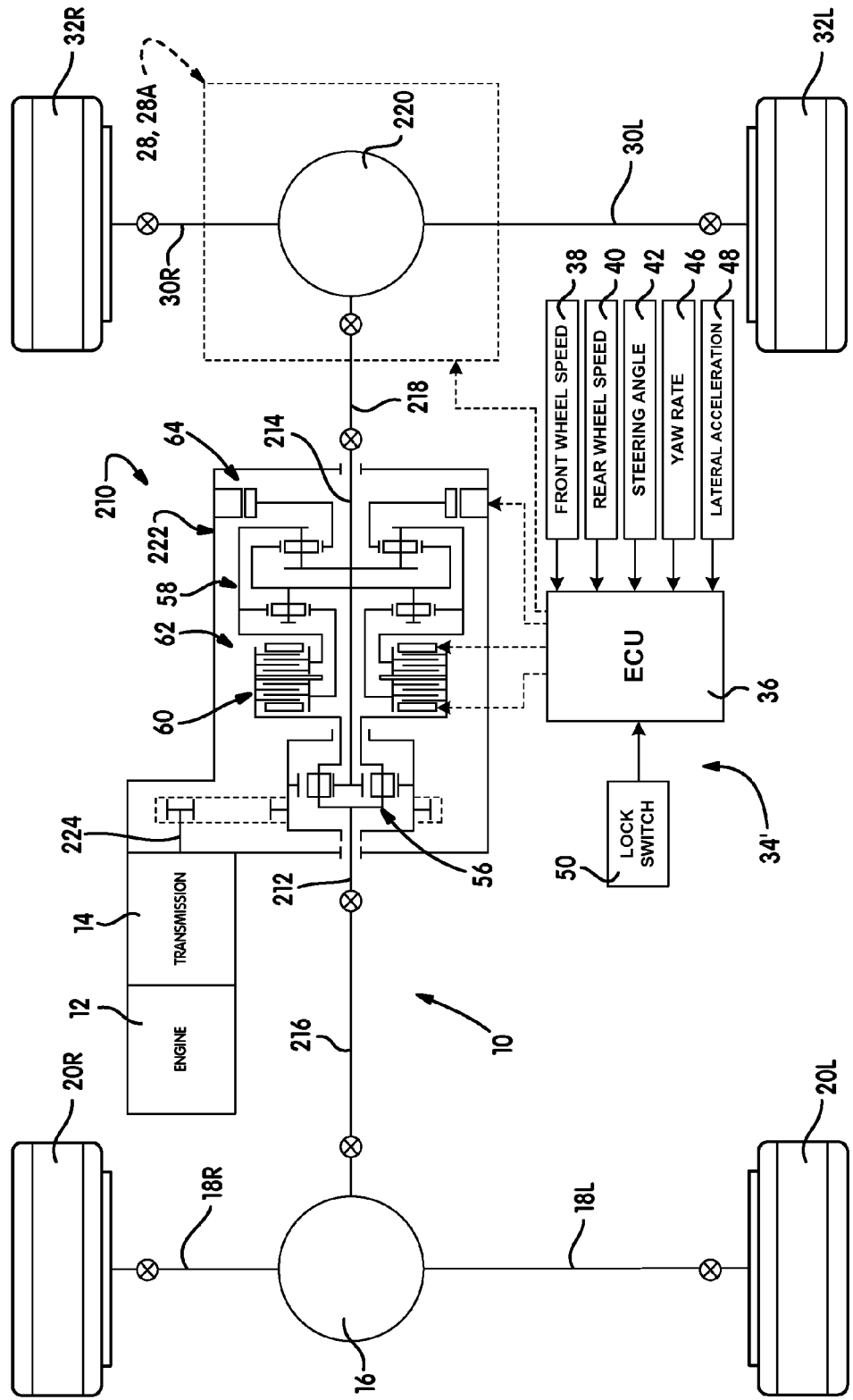
FIG. 5 is a diagrammatical illustration of the torque distributing differential assembly of the present invention installed in a power transfer unit for use in a four-wheel vehicle.

Referring now to FIG. 5, a four-wheel drive vehicle 10' is shown with a power transfer unit 210 operable for transferring drive torque from the output of transmission 14 to a first (i.e., front) output shaft 212 and a second (i.e., rear) output shaft 214. Front output shaft 212 drives a front propshaft 216 which, in turn, drives front differential 16 for driving front wheels 20L and 20R. Likewise, rear output shaft 214 drives a rear propshaft 218 which, in turn, drives a rear differential 220 for driving rear wheels 32L and 32R. Power transfer unit 210, otherwise known as a transfer case, includes a torque distribution mechanism 222 which functions to transmit drive torque from its input shaft 224 to both of output shafts 212 and 214 so as to bias the torque distribution ratio therebetween, thereby controlling the tractive operation of vehicle 10'. As seen, torque distribution mechanism 222 is operably associated with a traction control system 34' for providing this adaptive traction control feature.

Figure 6:
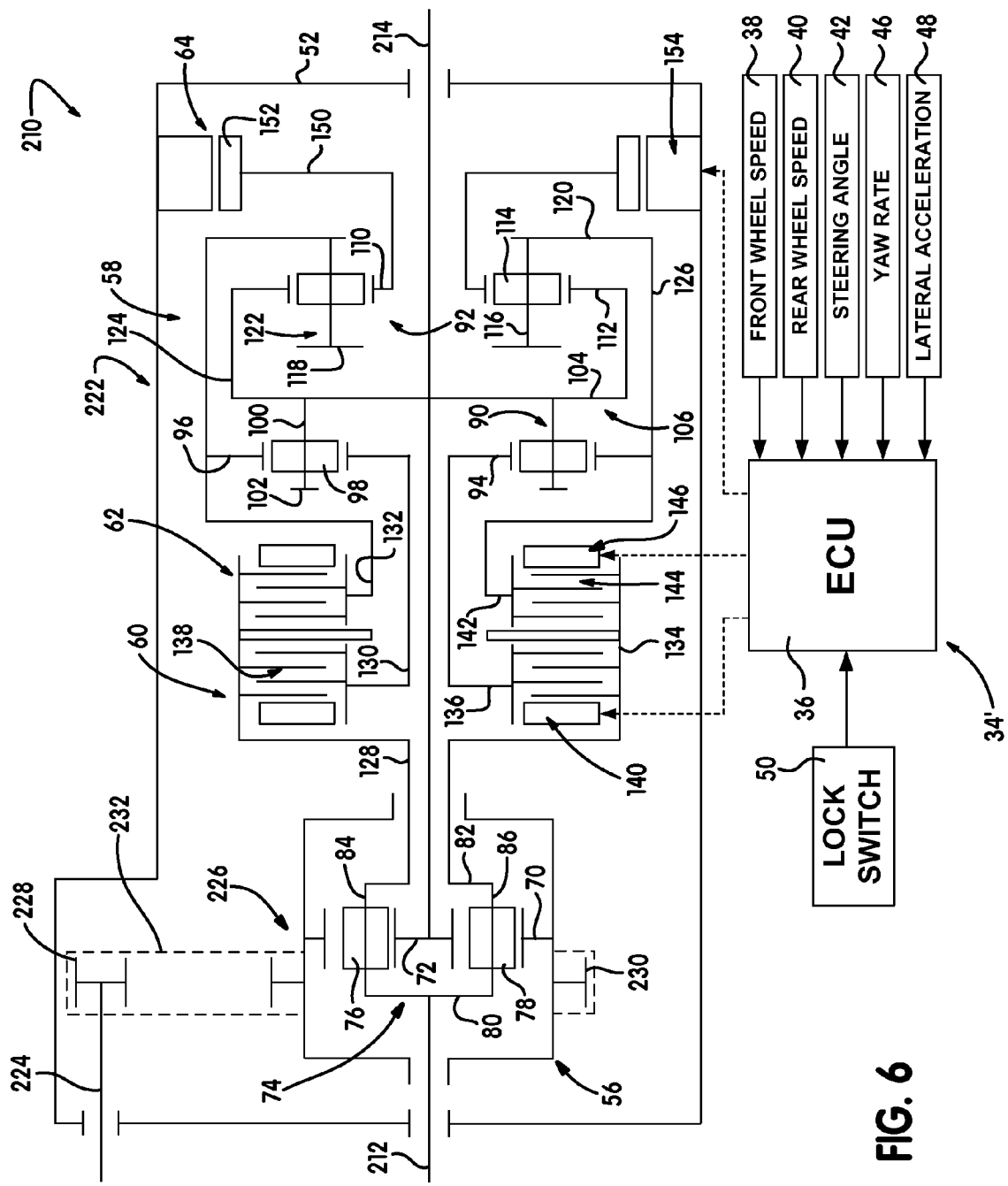
FIG. 6 is a schematic drawing of the power transfer unit shown in FIG. 5.

Referring primarily to FIG. 6, torque distribution mechanism 222 of power transfer unit 210 is shown to be generally similar in structure to drive mechanism 28 of FIG. 2 with the exception that ring gear 70 is now drivingly connected to input shaft 224 via a transfer assembly 226. In the arrangement shown, transfer assembly 226 includes a first sprocket 228 driven by input shaft 224, a second sprocket 230 driving ring gear 70 and a power chain 232 meshed therebetween. As seen, front output shaft 212 is driven by differential carrier 74 of differential unit 56 which now acts as a center or "interaxle" differential for permitting speed differentiation between the front and rear output shafts. In addition, sun gear 72 of differential unit 56 drives rear output shaft 214 while first planet carrier 106 of gearset 90 is also coupled to rear output shaft 214.

Control over actuation of brake 64 and mode clutches 60 and 62 results in corresponding increases or decreases in the rotary speed of rear output shaft 214 relative to front output shaft 212, thereby controlling the amount of drive torque transmitted therebetween. In particular, with both of the mode clutches and the brake released, unrestricted speed differentiation is permitted between the output shafts while the gear ratio established by the components of interaxle differential assembly 56 controls the front/rear torque ratio based on the current tractive conditions of the front and rear wheels. In contrast, with both mode clutches and the brake engaged, a locked four-wheel drive mode is established wherein no interaxle speed differentiation is permitted between the front and rear output shafts. Such a drive mode can be intentionally selected via lock switch 50 when vehicle 10' is driven off-road or during severe road conditions. An adaptive four-wheel drive mode is made available under control of traction control system 34' to vary the front-rear drive torque distribution ratio based on the tractive needs of the front and rear wheels as detected by the various sensors by selectively engaging brake 64 and then adaptively controlling engagement of mode clutches 60 and 62. In addition to power transfer unit 210, vehicle 10' could also be equipped with a rear axle assembly having either drive mechanism 28 or 28A and its corresponding yaw control system, as is identified by the phantom lines in FIG. 5.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including a rotary input member driven by said powertrain, a first rotary output member driving said first secondary wheel, a second rotary output member driving said second secondary wheel and a drive mechanism coupling said input member to said first and second output members, said drive mechanism including a differential assembly, a planetary gear assembly, first and second clutches and a brake, said differential assembly having an input component driven by said input member, a first output component driving said first output member and a second output component driving said second output member, said planetary gear assembly having first, second, third and fourth elements with said first element coupled to said first output member, said first clutch is operable for selectively coupling said second element of said planetary gear assembly to one of said input component and said second output component of said differential assembly, said second clutch is operable for selectively coupling said third element of said planetary gear assembly to the same one of said input component and said second output component of said differential assembly, and said brake is operable for selectively braking rotation of said fourth element of said planetary gear assembly; and
a control system for controlling actuation of said first and second clutches and said brake.

2. The motor vehicle of claim 1 wherein said drive mechanism is operable to establish a first drive mode when said brake is engaged with said first clutch engaged and said second clutch released such that said first output member is overdriven relative to said second output member.

3. The motor vehicle of claim 2 wherein said drive mechanism is operable to establish a second drive mode when said brake is engaged with said second clutch engaged and said first clutch released such that said first output member is underdriven relative to said second output member.

4. The motor vehicle of claim 3 wherein said drive mechanism is operable to establish a third drive mode when said brake is engaged with both of said first and second clutches engaged such that speed differentiation is prevented between said first and second output members.

5. The motor vehicle of claim 3 wherein said drive mechanism is operable to establish a third drive mode when said brake is released with both of said first and second clutches released such that uninhibited speed differentiation is permitted between said first and second output members.

6. The motor vehicle of claim 1 wherein said input component of said differential assembly is a differential carrier, said first output component is a first side gear coupled for rotation with said first output member, and said second output component is a second side gear coupled for rotation with said second output member, and wherein said differential assembly further includes pinion gears supported by said differential carrier and which are meshed with said first and second side gears.

7. The motor vehicle of claim 1 wherein said input component of said differential assembly is a ring gear, said first output component is a sun gear coupled for rotation with said first output member, and said second output component is a carrier coupled for rotation with said second output member, and wherein said differential assembly further includes pinion gears supported by said carrier and which establish a meshed connection between said ring gear and said sun gear.

8. The motor vehicle of claim 1 wherein said planetary gear assembly includes a first carrier fixed for rotation with said first output member and which rotatably supports first planet gears, a first sun gear meshed with said first planet gears, a first ring gear meshed with said first planet gears, a second sun gear, a second ring gear coupled to said first carrier, and a second carrier fixed to said first ring gear and which rotatably supports second planet gears that are meshed with said second sun gear and said second ring gear.

9. The motor vehicle of claim 8 wherein said first clutch is operable to selectively couple said first sun gear to said input component of said differential assembly, wherein said second clutch is operable to selectively couple said first ring gear to said input component of said differential assembly, and wherein said brake is operable to selectively brake rotation of said second sun gear.

10. The motor vehicle of claim 8 wherein said first clutch is operable to selectively couple said first sun gear to said second output component of said differential assembly, wherein said second clutch is operable to selectively couple said first ring gear to said second output component of said differential assembly, and wherein said brake is selectively operable to brake rotation of said second sun gear.

11. A drive axle assembly for use in a motor vehicle having a powertrain and first and second wheels, comprising:
an input shaft driven by the powertrain;
a first axleshaft driving the first wheel;
a second axleshaft driving the second wheel;
a differential assembly having an input component driven by said input shaft, a first output component driving said first axleshaft and a second output component driving said second axleshaft;
a planetary gear assembly having first, second, third and fourth elements with said first element coupled for rotation with said first axleshaft;
a first clutch for selectively coupling said second element of said planetary gear assembly to one of said input component and said second output component of said differential assembly;
a second clutch for selectively coupling said third element of said planetary gear assembly to one of said input component and said second output component of said differential assembly;
a brake for selectively braking rotation of said fourth element of said planetary gear assembly; and
a control system for controlling actuation of said first and second clutches and aid brake.

12. The drive axle assembly of claim 11 wherein a first drive mode is established when said brake is engaged with said first clutch engaged and said second clutch released such that said first axleshaft is overdriven relative to said second axleshaft.

13. The drive axle assembly of claim 12 wherein a second drive mode is established when said brake is engaged with said second clutch engaged and said first clutch released such that said first axleshaft member is underdriven relative to said second axleshaft.

14. The drive axle assembly of claim 13 wherein a third drive mode is established when said brake is engaged with both of said first and second clutches engaged such that speed differentiation is prevented between said first and second axleshafts.

15. The drive axle assembly of claim 13 wherein a third drive mode is established when said brake is released with both of said first and second clutches released such that uninhibited speed differentiation is permitted between said first and second axleshafts.

16. The drive axle assembly of claim 11 wherein said input component of said differential assembly is a differential carrier, said first output component is a first side gear coupled for rotation with said first axleshaft, said second output component is a second side gear coupled for rotation with said second axleshaft, and wherein said differential assembly further includes pinion gears supported by said differential carrier and meshed with said first and second side gears.

17. The drive axle assembly of claim 11 wherein said input component of said differential assembly is a ring gear, said first output component is a sun gear coupled for rotation with said first axleshaft, said second output component is a carrier coupled for rotation with said second axleshaft, and wherein said differential assembly further includes pinion gear supported by said carrier and establishing a meshed connection between said ring gear and said sun gear.

18. The drive axle assembly of claim 11 wherein said planetary gear assembly includes a first carrier fixed for rotation with said first axleshaft and which rotatably supports first planet gears, a first sun gear meshed with said first planet gears, a first ring gear meshed with said first planet gears, a second sun gear, a second ring gear coupled to said first carrier, and a second carrier fixed to said first ring gear and which rotatably supports second planet gears that are meshed with said second sun gear and said second ring gear.

19. The drive axle assembly of claim 18 where in said first clutch is operable to selectively couple said first sun gear to said input component of said differential assembly, wherein said second clutch is operable to selectively couple said first ring gear to said input component of said differential assembly, and wherein said brake is operable to selectively brake rotation of said second sun gear.

20. The drive axle assembly of claim 18 wherein said first clutch is operable to selectively couple said first sun gear to said second output component of said differential assembly, wherein said second clutch is operable to selectively couple said first ring gear to said second output component of said differential assembly, and wherein said brake is selectively operable to brake rotation of said second sun gear.

21. A drive axle assembly for use in a motor vehicle having a powertrain and first and second wheels, comprising:
an input shaft driven by the powertrain;
a first axleshaft driving the first wheel;
a second axleshaft driving the second wheel;
a differential assembly having an input component driven by said input shaft, a first output component coupled for rotation with said first axleshaft and a second output component coupled for rotation with said second axleshaft;
a first gearset having a first sun gear, a first ring gear, and a first planet carrier coupled for rotation with said first axleshaft and which rotatably supports first planet gears that are meshed with said first sun gear and said first ring gear;
a second gearset having a second sun gear, a second ring gear fixed for rotation with said first planet carrier, and a second planet carrier coupled for rotation with said first ring gear and which rotatably supports second planet gears that are meshed with said second sun gear and said second ring gear;
a brake for selectively inhibiting rotation of said second sun gear;
a first clutch for selectively coupling said first sun gear to one of said input component and said second output component of said differential assembly;
a second clutch for selectively coupling said first ring gear to one of said input component and said second output component of said differential assembly; and
a control system for controlling actuation of said first and second clutches and said brake.

22. The drive axle assembly of claim 21 wherein said first clutch is operable in a first mode to permit rotation of said first sun gear relative to said input component and in a second mode to prevent such relative rotation therebetween, wherein said second clutch is operable in a first mode to permit rotation of said first ring gear relative to said input component and in a second mode to prevent such relative rotation therebetween, wherein said brake is operable in a first mode to permit rotation of said second sun gear and in a second mode to prevent rotation of said second sun gear, and wherein said control system is operable for shifting each of said first and second clutches and said brake between their corresponding first and second modes.

23. The drive axle assembly of claim 22 wherein a first mode is established when said brake is in its second mode with said first clutch in its second mode and said second clutch in its first mode such that said first axleshaft is driven at an increased rotary speed relative to said second axleshaft, and wherein a second drive mode is established when said brake is in its second mode with said first clutch in its first mode and said second clutch in its second mode such that said first axleshaft is driven at a reduced rotary speed relative to said second axleshaft.

24. A transfer case for a four-wheel drive vehicle having a powertrain and first and second drivelines, comprising:
an input shaft driven by the powertrain;
a first output shaft driving the first driveline;
a second output shaft driving the second driveline;
a torque transfer mechanism operably interconnecting said input shaft to said first and second output shafts, said torque transfer mechanism including a differential assembly, a planetary gear assembly, a brake and first and second clutches, said differential assembly having an input component driven by said input shaft, a first output component driving said first output shaft and a second output component driving said second output shaft, said planetary gear assembly having first, second, third and fourth elements with said first element coupled to said first output shaft, said first clutch is operable for selectively coupling said second element of said planetary gear assembly to one of said input component and said second output component of said differential assembly, said second clutch is operable for selectively coupling said third element of said planetary gear assembly to the same one of said input component and said second output component of said differential assembly, and said brake is operable for selectively braking rotation of said fourth element of said planetary gear assembly; and
a control system for controlling actuation of said first and second clutches and said brake.

25. A power transfer assembly for use in a motor vehicle having a powertrain and first and second drivelines, comprising:
an input shaft driven by the powertrain;
a first shaft driving the first driveline;
a second shaft driving the second driveline;
a differential assembly having an input component driven by said input shaft, a first output component fixed for rotation with said first shaft, and a second output component fixed for rotation with said second shaft;

a planetary gear assembly having first, second, third and fourth elements with said first element coupled to said first shaft;

a first clutch operable for selectively coupling said second element of said planetary gear assembly to one of said input component and said second output component of said differential assembly;

a second clutch operable for selectively coupling said third element of said planetary gear assembly to one of said input component and said second output component of said differential assembly;

a brake operable for selectively braking rotation of said fourth element of said planetary gear assembly; and a control system for controlling actuation of said brake and said first and second clutches.

* * * * *